(12) United States Patent
Cook

(10) Patent No.: US 10,385,807 B2
(45) Date of Patent: Aug. 20, 2019

(54) EFFICIENCY AND EMISSIONS IMPROVEMENTS FOR NATURAL GAS CONVERSIONS OF EMD 2-CYCLE MEDIUM SPEED ENGINES

(71) Applicant: Clean Train Propulsion, Fullerton, CA (US)

(72) Inventor: David Cook, Fullerton, CA (US)

(73) Assignee: Clean Train Propulsion, Fullerton, CA (US)

( * ) Notice: Subject to any disclaimer, the term of this patent is extended or adjusted under 35 U.S.C. 154(b) by 85 days.

(21) Appl. No.: 15/816,830

(22) Filed: Nov. 17, 2017

(65) Prior Publication Data

US 2018/0149116 A1    May 31, 2018

Related U.S. Application Data

(63) Continuation-in-part of application No. 14/854,034, filed on Sep. 14, 2015, now Pat. No. 9,835,066, which is a continuation-in-part of application No. 14/217,058, filed on Mar. 17, 2014, now abandoned.

(60) Provisional application No. 62/424,914, filed on Nov. 21, 2016, provisional application No. 61/790,771, filed on Mar. 15, 2013, provisional application No. 62/128,296, filed on Mar. 4, 2015, provisional application No. 62/049,651, filed on Sep. 12, 2014.

(51) Int. Cl.
*F02M 21/02* (2006.01)

(52) U.S. Cl.
CPC .... *F02M 21/0251* (2013.01); *F02M 21/0209* (2013.01); *F02M 21/0269* (2013.01); *Y02T 10/32* (2013.01)

(58) Field of Classification Search
CPC .............. F02M 21/02; F02M 21/0209; F02M 21/0251; F02M 21/0269; F02M 45/12; F02M 45/086; F02M 51/06; F02M 51/0603; F02M 61/045; F02M 61/08; F02M 61/16; F02M 61/1806; F02M 61/182; F02M 61/06; F02M 61/10; F02M 61/42; F02M 61/1813; F02M 2200/46
USPC ....... 123/445, 451, 459, 468, 472, 498, 500, 123/501, 503, 504; 239/533.11, 533.12; 251/129.01, 129.02, 129.18, 445
See application file for complete search history.

(56) References Cited

U.S. PATENT DOCUMENTS

| 5,833,146 A * | 11/1998 | Hefler | F02M 47/027 239/533.8 |
| 2003/0201344 A1 * | 10/2003 | Wark | F02M 47/00 239/533.8 |

(Continued)

*Primary Examiner* — John Kwon
*Assistant Examiner* — Johnny H Hoang
(74) *Attorney, Agent, or Firm* — Richards Patent Law P.C.

(57) ABSTRACT

A gas injection valve includes a poppet valve extending from a valve body having a valve seat, a plunger moveable within a plunger body, a plunger stop axially moveable within a plunger stop enclosure formed within a plunger stop body secured within the valve body adjacent to the plunger body, a plunger follower secured to and extending through the plunger stop and in contact with the poppet valve, and a port for receiving hydraulic fluid extending through the valve body into the plunger stop body enclosure. The plunger stop is moveable between a first position and a second position. The gas injection valve has a first stroke length when the plunger stop is in the first position and a second stroke length when the plunger stop is in the second position.

12 Claims, 9 Drawing Sheets

(56) References Cited

U.S. PATENT DOCUMENTS

| | | | | |
|---|---|---|---|---|
| 2005/0017096 A1* | 1/2005 | Bachmaier | ......... | F02M 51/0603 239/584 |
| 2011/0232606 A1* | 9/2011 | Peters | ................ | F02M 51/0603 123/445 |
| 2015/0252767 A1* | 9/2015 | Peters | ................ | F02M 51/0603 123/472 |

* cited by examiner

Valve Partially Open

Valve Full Open

EMD 12 Cylinder

| Crank Angle to next Firing | Firing Crank Angle | Firing order | | | Firing order | Firing Crank Angle | Crank Angle to next Firing |
|---|---|---|---|---|---|---|---|
| 52.5 | 45 | 3 | 7 | 1 | 1 | 0 | 22.5 |
| 52.5 | 285 | 11 | 8 | 2 | 9 | 240 | 22.5 |
| 52.5 | 165 | 7 | 9 | 3 | 5 | 120 | 22.5 |
| 22.5 | 142.5 | 6 | 10 | 4 | 4 | 97.5 | 22.5 |
| 22.5 | 262.5 | 10 | 11 | 5 | 8 | 217.5 | 22.5 |
| 22.5 | 22.5 | 2 | 12 | 6 | 12 | 337.5 | 22.5 |

Flywheel End

Firing Order: 1, 12, 7, 4, 3, 10, 9, 5, 2, 11, 8, 6

EMD 12 Cylinder

| Crank Angle to next Firing | Firing Crank Angle | Split Firing Order | | | Split Firing Order | Firing Crank Angle | Crank Angle to next Firing |
|---|---|---|---|---|---|---|---|
| 75 | 45 | <u>2</u> | 7 | 1 | <u>1</u> | 0 | 45 |
| 75 | 285 | <u>6</u> | 8 | 2 | <u>5</u> | 240 | 45 |
| 75 | 165 | <u>4</u> | 9 | 3 | <u>3</u> | 120 | 45 |
| 75 | 142.5 | 2 | 10 | 4 | 1 | 97.5 | 45 |
| 75 | 262.5 | 4 | 11 | 5 | 3 | 217.5 | 45 |
| 75 | 22.5 | 6 | 12 | 6 | 5 | 337.5 | 45 |

Flywheel End

Split Firing Order: 1, 7, 3, 9, 2, 8

FIG 5A

EMD 16 Cylinder

| Crank Angle to next Firing | Firing Crank Angle | Firing order | | | Firing order | Firing Crank Angle | Crank Angle to next Firing |
|---|---|---|---|---|---|---|---|
| 22.5 | 45 | 3 | | 1 | 1 | 0 | 22.5 |
| 22.5 | 315 | 15 | | 2 | 13 | 270 | 22.5 |
| 22.5 | 135 | 7 | | 3 | 5 | 90 | 22.5 |
| 22.5 | 225 | 11 | | 4 | 9 | 180 | 22.5 |
| 22.5 | 247.5 | 12 | | 5 | 10 | 202.5 | 22.5 |
| 22.5 | 157.5 | 8 | | 6 | 6 | 112.5 | 22.5 |
| 22.5 | 337.5 | 16 | | 7 | 14 | 292.5 | 22.5 |
| 22.5 | 67.5 | 4 | | 8 | 2 | 22.5 | 22.5 |
| | | | | Flywheel End | | | |

Firing Order: 1,8,9,16,3,6,11,14,4,5,12,13,2,7,10,15

EMD 16 Cylinder

| Crank Angle to next Firing | Firing Crank Angle | Split Firing Order | | | Split Firing Order | Firing Crank Angle | Crank Angle to next Firing |
|---|---|---|---|---|---|---|---|
| 45 | 45 | 2 | | 1 | 1 | 0 | 45 |
| 45 | 315 | 8 | | 2 | 7 | 270 | 45 |
| 45 | 135 | 4 | | 3 | 3 | 90 | 45 |
| 45 | 225 | 6 | | 4 | 5 | 180 | 45 |
| 45 | 247.5 | 2 | | 5 | 1 | 202.5 | 45 |
| 45 | 157.5 | 8 | | 6 | 7 | 112.5 | 45 |
| 45 | 337.5 | 4 | | 7 | 3 | 292.5 | 45 |
| 45 | 67.5 | 6 | | 8 | 5 | 22.5 | 45 |
| | | | | Flywheel End | | | |

Split Firing Order: 1, 9, 3, 11, 4, 12, 2, 10

FIG 5B

EFFICIENCY AND EMISSIONS IMPROVEMENTS FOR NATURAL GAS CONVERSIONS OF EMD 2-CYCLE MEDIUM SPEED ENGINES

CROSS-REFERENCE TO RELATED APPLICATIONS

This application claims the benefit of benefit of priority to U.S. Provisional Application No. 62/424,914 filed on Nov. 21, 2016, and comprises a continuation-in-part of U.S. application Ser. No. 14/854,034, filed Sep. 14, 2015, which is a continuation-in-part of U.S. application Ser. No. 14/217,058, filed Mar. 17, 2014, which claims the benefit of priority to U.S. Provisional Application No. 61/790,771 filed on Mar. 15, 2013. U.S. application Ser. No. 14/854,034 filed on Sep. 14, 2015, also claims the benefit of priority to U.S. Provisional Application No. 62/128,296 filed Mar. 4, 2015, and U.S. Provisional Application No. 62/049,651 filed on Sep. 12, 2014. The disclosures of the above-mentioned applications are incorporated by reference herein.

BACKGROUND OF THE INVENTION

The first portion of the background is most closely related to a sonic and dual stage gas inlet valve. In the case of the ECI conversions systems for 2 stroke locomotive engines, a system called low pressure direct injection (LPDI) is used where the natural gas is injected directly into the cylinder during the compression stroke. What this leads to is a mixing challenge where the air and fuel have limited time to mix as the piston rises up to top dead center right before ignition.

This mixing challenge is why SwRI on their single cylinder development EMD 710 engine decided to do pre-mixing of the air and fuel even though it would not be practical on an 'in service' engine as too much unburned fuel would blow through the cylinder into the exhaust while scavenging.

The in cylinder mixing issue can make prechamber operation difficult if a rich pocket of air and gas gets pushed into the prechamber which already has excess fuel in it. In this instance, the prechamber will misfire and there will be no combustion for that stroke. For this reason. ECI installed 'jet caps' on the first iteration spark ignited prechamber (SIP) system on the Napa Valley Wine train. The jet cap is an additional cap fixed over the end of the main Gas inlet valve (GIV). The GIV had a poppet valve at the end that controlled the flow of fuel gas into the combustion chamber. With the 'jet cap' in place, after the gas flowed thru the GIV body and past the poppet valve, it then had to flow through a small orifice at the end of the 'jet cap'. This addressed several issues, all the gas was converged into one flow stream that now had higher velocity and was pointed away from the prechamber.

Another difference between the ECI kit and the system tested at SwRI is that the ECI system has to operate at very high Lambdas. Lambda is the ratio of the actual air/fuel ratio divided by the stoichiometric air/fuel ratio. Typical 4 stroke diesel engines operate at Lambdas around 1.9 at low load to 1.4 at full power. The SwRI single cylinder development engine didn't have to operate below 50% power. At low loads, an EMD 2 stroke locomotive operates at Lambda's above 3 and at idle the Lambda can exceed 4. At these very high lambdas it would require a larger prechamber that will produce fewer NOx emissions and have a lower thermal efficiency.

A solution to the very high Lambda value is to restrict inlet flow with a throttling system at low loads. This will allow operating the engine all the way from idle to full load with smaller volume prechambers that put out less NOx emissions and operate at higher thermal efficiency.

In a uniflow 2 stroke engine, scavenging is a process of blowing inlet air over the top of the piston at bottom dead center. This entering intake air pushes the spent combustion gasses out through the open exhaust ports at the top of the cylinder. The amount of in cylinder air motion and mixing as the piston rises in the compression stroke is proportional to how much velocity the inlet air carried in with it due to excess intake air box pressure. When the inlet is throttled to help reduce the low load air fuel Lambda, a large portion of this mixing energy is lost.

It is possible to reduce the inlet air box pressure to a low enough value that not enough inlet air enters to thoroughly scavenge the cylinder and some amount of exhaust gas will remain in the cylinder when the exhaust valves close. This effect can be desirable or have negative effects. This left over combustion gas is much hotter and less dense than the incoming air, so the resulting in cylinder air mass will now be lower and the average in cylinder temperature will be hotter at the beginning of the compression stroke. This has the double effect of both lowering the Lambda for easier combustion with less ignition energy using a smaller prechamber, and also faster and more efficient combustion because the compressed air fuel mixture is already much hotter at ignition.

This is referred to as internal exhaust gas recirculation (EGR) where exhaust gas is purposely left behind to achieve these effects. In a uniflow 2 stroke, the downside of this is much less air velocity at intake port closing. This lowered in cylinder velocity and mixing energy reduces the amount of air and fuel mixing when the natural gas is injected at low loads.

A supersonic injector for gaseous fuel engines as described in U.S. Pat. No. 6,708,905 would be a solution that offers improved mixing and a bonus of lower temperature gas when injected. This particular device has two drawbacks. First it has many machined parts with complicated features that will be costly. Second, the design has a built in cavity where residual natural gas will be compressed into and remain unburned during the combustion event. Most of the compressed gas in this cavity will become methane exhaust emissions. This release of unburned methane is both a pollution emissions problem and an energy efficiency problem.

What is desired is an economical and practical way to achieve the benefits of a high velocity and focused sonic injection nozzle without the added cavity for residual unburned methane, better mixing in the combustion chamber of a natural gas engine with direct gas injection which would allow operating a uniflow 2 cycle engine to be throttled past the point that internal EGR effects are improving combustion.

The second portion of this background is most closely related to continuous water injection for ECI converted engines. Water injection has been used in engines to reduce engine knock at higher power levels as far back as World War 2. It was commonly used to allow aircraft engines to generate extra power during takeoff and other possible events that needed the most power possible.

It has also seen some use in racing applications, typically in sprint type racing where the time duration of full power and water injection use is limited, thus avoiding a bulky and heavy water storage system.

There are several issues that make water injection not worth the effort of implementation in most mobile applications; one is the volume and weight of the consumable water and second is the need to refill the container that would store it. Once these issues are overcome, then there is the environmental issue of keeping the stored onboard water from freezing when the vehicle is not in operation.

Another issue is the challenge of corrosion to the hardware that would be used to inject it, especially if the injector is designed to open and close rapidly for each cylinders combustion cycle.

Finally is the corrosion issue as related to any other parts. If after shut down an injector would leak water into the engine cylinder during engine storage, that cylinder will have internal corrosion and suffer significant maintenance issues.

Several Papers have indicated that direct injection of water into the engine cylinder has several advantages in addition to reducing engine knocking. SAE paper 2009-01-1925 Effect of In Cylinder Water Injection Strategies on Performance and Emissions of a Hydrogen Fueled Direct Injection Engine is one good example. In this paper it is indicated that water injection both lowered NOx emissions and increased the indicated thermal efficiency when the water injection happened during the compression stroke. This effect was much less when the water was injected during the intake stroke on the four stroke engine tested.

When converting a diesel engine over to operate on natural gas, the compression ratio is typically reduced. If it wasn't reduced the engine may be limited to only generation of 60% of its original diesel operation rated power. The addition of water injection could allow the retention of higher compression ratios.

The third portion of this background is most closely related prechamber cylinder deactivation on spark ignited prechamber EMD engines. Both the roots blown and turbocharged EMD engines would be good candidates for cylinder deactivation. Currently ECI used skip firing in their Spark Ignited Prechamber systems to improve combustion at very low loads where the engine operates very lean. In skip fire, the engine controller will skip actuating the main injector for a certain cylinder. This will cause the other cylinders to have to operate at a higher power to make up the lost power from the deactivated cylinders. When operating at higher power the other cylinders will need more fuel to generate it and this increase in fuel to those cylinders is what decreases how lean those cylinders are before ignition which generates higher heat release rates making the combustion events more consistent, and efficient. The control system has a strategy to alternate the deactivated cylinders to prevent any one cylinder from becoming significantly cooler than the others and also to prevent lube oil build up in that cylinder.

To keep the system simple, only the main gas injector is turned off for the cylinders that are skipped. All of the engine prechambers are still fed natural gas and the spark plugs are still fired. In the case where the prechamber supply pressure can be held constant over the entire engine operating range, the prechamber fuel supply system consists of only a single mechanical pressure regulator with a fixed setting.

Because the prechamber is still fed fuel, but the main chamber is not, there is no guarantee that the mixture in the prechamber is being burned when a cylinder is deactivated, even when the spark plug is still being fired. A portion of the fuel burned in the prechamber during normal combustion was not injected by the prechamber fuel system, but was brought in from the main chamber. When the cylinder is deactivated the air pushed into the prechamber by the piston will not have any fuel so the overall mixture in the prechamber may be too lean for the spark to burn. This is greatly dependent on engine speed and load while being skip fired. Because skip fire happens at low load it's likely that the extended time the system gets to fill the prechamber offsets this deactivated cylinder issue, but at the same time the operating cylinders are running richer and having the deactivated cylinders prechambers rich enough to fire may make the activated prechambers too rich causing misfires or combustion instability.

With these issues in mind, prechambers that are fed fuel in deactivated cylinders are likely to generate more NOx or HC or both. The generation of Non-Methane HC emissions is especially problematic as after the spark plug initiates combustion in the prechamber some unburned natural gas is pushed out of the prechamber into the main chamber before it is burned inside the prechamber.

BRIEF SUMMARY OF THE INVENTION

The first portion of the summary is most closely related to a sonic and dual stage gas inlet valve. What is proposed here is a gas inlet valve (GIV) that utilizes the valve head and valve seat at a narrower angle than 120 degrees on the prior art GIV to accelerate the incoming natural gas flow and direct it further away from cylinder walls.

This configuration has several advantages. First it merely requires a change in operating pressure and revised machining on two components to gain this effect.

Second, as the gas exits from an annulus instead of a hole, the gas exits as a cone formed from a sheet of gas with both an inner surface and outer surface. This surface is where the mixing happens and this design will have over twice the surface area for entraining the surrounding air.

Third, as the nozzle is formed by the movement of the poppet valve from the seat, the stoke can be adjusted to different sonic throat areas. Allowing longer valve opening times at higher pressures and lower flows.

This design completely eliminates the issue of residual unburned gaseous fuel remaining inside of a cavity in the GIV or Jet Cap after combustion.

These sonic GIV units can operate with any gaseous fuel including propane and hydrogen.

The second portion of this summary is most closely related to continuous water injection for ECI converted EMD engines. If it were possible to directly inject water into an Energy Conversions Inc (ECI) converted EMD engine, it may be possible to make enough power with the stock piston compression ratio that a piston change can be avoided during conversion. This saves a significant amount of labor and cost, plus has the benefit of higher efficiency and/or lower NOx emissions.

Effective direct injection of water into an ECI converted EMD 2-stroke engine could be accomplished by injecting the water into the body of the hydraulically actuated natural Gas Inlet Valve (GIV). This will mix it with the fast moving natural gas that is then injected into the engine cylinder during the compression stroke. This allows direct injection of the water without having to create a new custom cylinder head with an additional passage for an additional injector with access to the combustion chamber. This is most applicable to engines using Low Pressure Direct Injection Systems (LPDI) where the natural gas is injected into the engine during the compression stroke at only a few hundred psi, whereas High Pressure Direct Injection (HPDI) operates its injectors at pressures above 4000 psi and would be a challenge to combine the water with the gas and also only open for a few degrees of crank rotation.

Unlike 4 stroke engines, the airflow is only at a high velocity as it goes though the liner ports. In a typical port injected engine, the water can be sprayed into the air in the inlet port which is only momentarily stationary and will then all be at a high velocity as it is inducted into the engine cylinder. In the uniflow 2 stroke airbox the airflow for the most part travels slowly up until it radially approaches the liner ports at which point it will achieve its highest velocity. This is because the air in a 4 stroke engine goes through a nearly constant cross section intake runner up to the combustion chamber, where as a uniflow 2 stroke engine has a larger plenum of intake air around the liner that only speeds up as the flow streams merge on their way to a liner port. While fumigating a 4 cycle engine intake runner can be effective, this makes fumigating the airbox area of a uniflow 2 stroke with atomized water challenging without risk of water separating out and causing puddles.

Unlike on road truck diesel engines and automobiles that attempt to operate at high loads at as low an RPM as possible. In a locomotive operating cycle the engines speed or RPM will increase as load is increased. Because the water is only needed at higher RPM, it may be possible to use a Continuous Injection System (CIS) to inject the water into the GIV. At higher RPM the GIV may spend up to 35% of its time open and flowing gas. Intuitively it would seem that pulsing of the water would be needed, but similar to early versions of port fuel injection, the water mist in the GIV could be sprayed continuously. In the case of port fuel injection, air would be flowing by the injectors less than 25% of the time and it would not be flowing fast. In the case of the 2 stroke GIV system, the GIV could be open longer and the natural gas and atomized water mixture would be flowing at sonic speed.

This eliminates the cost and complexity of having a high speed on-off water injector at each cylinder. It also reduces the needed water line size to each injector as the fluid flows continuously instead of only 25% or less of the time.

The ECI conversion system combined with CIS water injection has another water injection system benefit. Because the ECI conversion system regulated the main natural gas supply to 110 psi, and then reduces it to actual GIV operating pressure using the Gas Flow Control Valve (GFCV), it would be possible to purge the water injection system of all water after engine shutdown by taking main pressure 110 psi natural gas and purging the water injection system with it. By doing this at a higher RPM, but lower load, the GFCV will be operating the GIV's at much lower pressure and the incoming natural gas will force the water through the system after a certain amount of time. In order for this to work, the areas that need to be cleared of water need to flow downhill to the water injection nozzle at the GIV.

If this purge gas were to be fed to the water injection through a specific fixed orifice it would be possible to sense when the water lines and injector nozzles were clear of water by sensing the pressure drop in the water injection manifold. As natural gas will flow much more quickly through the water injection nozzles than the actual water would, once the system is free of water, the pressure in the water injection manifold will drop. Further by monitoring this pressure, system health and clogged nozzles can be detected. Both by the rate of manifold pressure drop and how much it dropped.

The third portion of this summary is most closely related to group cylinder deactivation on prechamber ignited EMD engines. Proposed is the deactivating of groups of cylinder in the EMD engine by not firing the main GIV injector and also by interrupting the flow of fuel to the prechambers. The configuration of the EMD and its firing order make this a reasonable prospect.

In another embodiment, the simple control valve that turns on and off the supplemental fuel to the groups of prechambers could be replaced by an advanced prechamber fuel pressure control module (PPCM) which would offer other engine operating advantages. Proposed is an integrated pressure supply module using two or more PMW valves to control the prechamber pressure supply. This would be a single module that only needed a low voltage power source and the operating pressure command. It would then read the operating pressure of its own gas rail pressure sensor and control the valves. At higher flows with multiple valves, one or more of the valves could be left open full time and then one or two of the other valves manipulated in a PWM fashion. This ability to leave a valve open full time minimizes the wear on the valve and extends its service life. With multiple valves the job of operating in PWM mode can be alternated between valves to equalize valve life.

On an engine platform like a locomotive where steady state loads are common, this alternating the duty cycle of valves allows the PPCM to also check the valves against each other. This allows determining if one valve of the set is malfunctioning, and if the PPCM has an extra valve capacity it could send a warning fault code that it needs service in the future while still functioning.

When used for cylinder deactivation on an EMD engine, comparing the operation of each PPCM to each other to maintain the same prechamber rail supply pressure would be a good way to detect prechamber check valve issues. If one PPCM indicated a higher or lower duty cycle or flow, then that would indicate something was wrong in the group of prechambers belonging to that PPCM. Many issues could cause this fault, a disconnected prechamber feed line, a stuck prechamber check ball, a leaking prechamber ball and seat or a clogged prechamber body feed hole are some possibilities.

Now that prechamber fuel supply can be varied and banks of prechambers are being turned on and off with some form of cylinder deactivation, it will be beneficial to vary the prechamber fuel supply pressure when turning on the prechambers. When a bank of prechambers is turned back on, they will have cooled down from operating temperature and will have trouble firing a leaner mixture. At this point the PPCM should be commanded to operate at a slightly higher pressure temporarily so that the mixture is closer to stoichiometric and will be ignited by the spark plug easier and burn quicker. Once the prechamber is hot, the PPCM can be instructed to lower the supply pressure so the prechambers run leaner and produce less NOx.

The fourth portion of this summary is most closely related to an OPOC variable compression ratio mechanism. While the OPOC engine being developed by ECO Motors is not an EMD 2 Stroke engine as currently used in locomotives. It does offer interesting possibilities as a power plant for genset type locomotives or as a Head End Power generator engine for passenger locomotives. The value of the OPOC's low weight and volume compared to its power output are even higher for these application when there is an effort to operate the locomotive on an alternate fuel. A typical diesel engine design converted to natural gas will need to be scaled up 30% bigger in size to make the same power.

Because of the unique nature of the OPOC engine design, it is possible to incorporate an infinitely adjustable variable compression ratio (VCR) using an outer wrist pin with an offset inner wrist pin bore.

A sliding spline fit is used to control the rotation of the outer wrist pin, because this is a two stroke engine, the piston will always be under compression when operating so that all of the VCR component slop should be taken up. The only wear items would be the parts of the sliding spline and they are replaceable without having to remove the piston.

The fifth portion of this summary is most closely related the use of a tilted mixing throat in a supplementally fueled prechamber.

When supplemental fuel is injected into a prechamber in order to richen the mixture of air and fuel in the prechamber, mixing of the supplemental fuel with the incoming lean main chamber air/fuel mixture is important to insuring stable combustion in the prechamber. For gaseous fuels injected at pressures below 100 psi this is even more of a challenge over liquid fuels injected at the same or higher pressure. Because of the tight packaging for most prechambers and the need for both a spark plug and a fuel port, a standard prechamber nozzle main orifice that injects the combustion chamber air and fuel along the combustion chamber axis will cause internal recirculation that will mix the fuel and air on the side of the chamber that it was injected on whereas the spark plug side of the prechamber could be left leaner than it would be if the mixture of supplemental fuel and incoming main chamber lean air/fuel mixtures was well distributed. If the mixture directly in the vicinity of the spark plug is not rich enough, the prechamber could misfire. Overcoming poor mixture in the prechamber could require adding more supplemental fuel than needed to the prechamber. While this excess fuel might leave a ignitable mixture of air and fuel near the spark plug, other parts of the prechamber can end up too rich resulting in incomplete combustion in the prechamber resulting in lower prechamber pressure and energy and higher hydrocarbon emissions from the engine.

Prechambers are typically manufactured in at least 2 parts, a main body and a welded on nozzle. Prechamber nozzles are usually cylindrical in shape and have jets located radially. This leads to economical manufacture on lathe machinery along an axis of symmetry.

Proposed here is a prechamber nozzle feature that redirects the incoming prechamber flow of main chamber air and fuel angled away from the prechamber axis to assert an in initial angular incoming flow and resulting swirling flow across the top of the prechamber volume.

The sixth portion of this summary is most closely related to the use of a mixture of air and fuel as the medium injected as supplemental fuel into a prechamber.

When supplemental fuel is injected into a prechamber in order to richen the mixture of air and fuel in the prechamber, mixing of the supplemental fuel with the incoming lean main charge is important to insuring stable combustion in the prechamber. For gaseous fuels injected at pressures below 50 psi this is even more of a challenge over liquid fuels injected at the same or higher pressure. The increased injection volume afforded by the additional air adds several beneficial effects.

Increased mass flow allows increasing the fuel injection passage size reducing flow variations due to tolerance effects. In one truck engine system, the fuel passage was only 0.032 inches in diameter.

If an independent injector is used for each prechamber, this increased mass flow allows increasing the size of the injector with the same benefits of the passage size improvement above Increased mass flow allows operating at higher pressure deltas increasing penetration and mixing of the injected supplemental fuel with the incoming air and fuel from the main chamber Increased injected volume improves scavenging reducing the amount of residual combustion byproducts left over in the prechamber combustion volume from the previous cycle.

Especially beneficial for prechambers used with stoichiometric air fuel ratios and cooled EGR as there is no excess oxygen available in the main charge for any supplemental fuel added to the prechambers to mix and combust with.

The seventh portion up this summary is a supplemental air to air intercooling for EMD turbocharged medium speed locomotive engines.

Standard separate circuit aftercooling system retrofits for EMD locomotives uses an additional pair of radiators to cool water to a lower temperature than the engine cooling jacket water and then use this low temperature water inplace of the jacket water in the aftercooler. In order to still use heated jacket water at lower engine loads to maintain good combustion, this requires an additional 3 way control valve to modulate either the higher or lower temperature coolant and leads to complexity keeping the water in the low temperature circuit from freezing during winter months.

In longer 16 and 20 cylinder versions of the engine, this also leads to various intake air temperatures depending on where a cylinder is located in the engine, as the airbox is part of the engine crankcase, its temperature is close to that of jacket water so that the further away a cylinder is from the aftercooler core that is cooled by low temperature water, the hotter the intake air gets right before it enters the engine cylinder. This somewhat limits the benefit of the lower temperature circuit and for natural gas engines could either lower its peak power of reduce the diesel displacement in a dual fuel engine.

If, instead of a pair of series heat exchangers (air to liquid, then liquid to air) an air to air cooler was used, the actual intake air temperature would be further reduced by going from two cooling steps to one. In a preferred embodiment, the air would be extracted after it leaves the aftercooler and then drawn by a blower through a second air to air cooler and then returned to the engine air box.

By using a blower to drive the air through the circuit, controlling the amount of cooling is simply a matter of adjusting the blower speed. To have minimum cooling air go through the system the blower would be off, for maximum cooling the blower would be turned on to its maximum speed.

If the system extracts the air from downstream of the aftercooler core then the hot air leaving the turbocharger will be partially cooled before it hits the blower, this cooler air reduces the total size or required capacity of the air to air cooler.

This system could also allow the existing cooling system to remain in its stock configuration. There is now no need to modulate the jacket water flow to the existing aftercooler cores. For low load operation the blower will be off and the jacket water heats up the air as it always did. For high power operation the jacket water in the aftercooler cores precools the air before it goes through the blower and to the air to air cooler. At medium power levels the jacket water may be a few degrees too hot and actually heat the intake air slightly before it gets to the blower, but as the system is designed to adequately cool at full power, this excess heat is easily removed.

The prior art system by EMD replaces the stock two medium size water pump with one larger one for the jacket water and a smaller one of the intercooling. It also requires new and expanded plumbing to get the water from the single big jacket water pump to both circuits in the engine cooling system and additional water plumbing and control valve for the intercooler circuit. This greatly increases the amount of connections for possible water leaks.

An additional added feature is the ability to now distribute the incoming return air to the airbox at multiple points to avoid the previously mentioned temperature variations. At each cylinder along the engine there is a removable air box cover. Different numbers of these airbox covers can be used to inject air into several the airbox cylinder covers. If every other airbox cover is used, the furthest distance the cooled air has to travel to get to a cylinders inlet ports is over one half of one cylinder instead of the stock configuration where on the last cylinder, the intake air had to pass 7 heated cylinders in a 16 cylinder engine.

When used for updating older engines, this concept has several cost advantages. The low cost, original, engine mounted single pass aftercooler cores, medium sized jacket water pumps and all plumbing stay the same. These parts are low cost and commonly made by multiple manufacturers, whereas the newer parts are required to be purchased only from EMD/Caterpillar making them sole source and expensive. Because the water system stays the same it has many less possible leak points and therefor failure modes. Any failure in the closed coolant loop is cause for engine shut down and therefore having a stuck passenger locomotive out on the rail. If an air system were to have a leak, performance would be reduced, but the locomotive could limp home. Also a coolant leak could result in the loss of over 300 gallons of engine coolant which is both costly and possibly a hazardous spill. Leaks in the air system are easily repaired with no loss of coolant. The engine could likely continue operation under fault conditions until the end of the route.

In a preferred embodiment, the blower that moves the air through this intercooler system would be at the turn around point between the two sections of a double pass heat exchanger. Having the blower after the first pass of the after cooler reduces the power needed and the size of the blower as the now cooler air is at a higher density. Having the air go through the second pass after the blower allows the temperature increase caused by the inefficiency and pressure rise of the blower to be removed. Because this is done in two passes, it also increases the effectiveness of the heat exchanger over a single pass system. As the ambient cooling air first cools lower temperature second pass charge air for the full length of the heat exchanger, and then the slightly heated ambient air then cools the much hotter charge air that has just left the turbo charger compressor over the full length of the heat exchanger.

The eighth portion of this summary is a hydraulic fuel loss checking system for LPDI natural gas engines using micropilot diesel injection for ignition When combined with hydraulically operated natural gas injectors in a LPDI injection system, micropilot diesel injectors can be operated off of the hydraulic pump system if the hydraulic fluid is also diesel fuel. The hydraulic pump now takes the place of a common rail high pressure fuel pump in conventional common rail fuel injection systems.

In an LDPI system using a prechamber, the pressure of the micro pilot diesel fuel does not have to be as high as main chamber fuel injection, it could be low enough that it could come from the same pumping system as the pressure used for actuating the hydraulic injectors, typically 1500 to 3000 psi. One risk of using diesel fuel for this purpose is if the hydraulic system has a leak of fuel internal to the engine, this fuel will dilute the engine oil. Because a locomotive has such a large amount of fuel, this leak could add significant amounts of fuel to the oil before it is detected and cause significant engine damage. One way to monitor this condition would be to monitor the oil level, but with 200 gallons of oil in a typical locomotive, a significant amount of dilution would have to occur before it is noticed. Another problem with this method is that the engines oil level will drop over time due to oil consumption and the fuel could have to make up for a large amount of consumed oil before the oil level sensing system would start to detect the fuel dilution.

With a system on a Mother slug locomotive set, it is likely that the mother locomotive will retain its full size diesel fuel tank and at a 1% micropilot fueling rate, it would only need the fuel tank refilled every 100 refuelings of the natural gas system.

If the slug were to hold 1000 DGE of natural gas, only 10 gallons of diesel fuel would be needed for every natural gas refueling. If the mother locomotive had a second smaller 20 gallon diesel fuel tank that was replenished every time that the natural gas locomotive was refueled. There would be a much smaller amount of fuel that could become dilutant in the engine oil. The system could be designed to automatically top off the 20 gallon diesel tank every time the natural gas system senses that it was refueled, or the system could be done manually by the refueling crew when they refuel.

At 20 gallons the most fuel that could end up in the oil is the 20 gallons and then the engine would stop automatically. With modern controls and a level sensor in the 20 gallon diesel tank, the system could automatically calculate how much diesel was injected as micropilots and when the diesel tank showed excessive measured fuel consumption compared to the calculated fuel consumption, the system could fault and or shut down.

DESCRIPTION OF THE DRAWINGS

FIG. 5A is a table illustrating the firing order variations for a 12 cylinder EMD 2-stroke engine.

FIG. 5B is a table illustrating the firing order variations for a 16 cylinder EMD 2-stroke engine.

DETAILED DESCRIPTION

To facilitate an understanding of the present disclosure, a number of terms and phrases are defined below:

Gaseous Fuel: The predominant gaseous fuel used in internal combustion engines is natural gas consisting mostly of methane, but with minor modifications these engines could consume any gaseous fuel including but not limited to propane, natural gas and hydrogen. In this document the term natural gas and gaseous fuel are used interchangeably.

Hydrocarbon (HC): Emissions resulting from incomplete combustion.

Main Charge: The air fuel mixture in the main combustion chamber space between the piston top and the cylinder head. If an opposed piston engine, this would be the space between the opposed piston faces.

Particulate Matter (PM): Particulate matter is a criteria pollution emitted from many sources. In this document we will commonly refer to it simply as PM. It could include both diesel soot PM that is considered toxic in California or the type of PM created by the consumption and combustion of lube oil from an engine. While still considered PM as a criteria emission, the PM from lube oil consumption is considered less toxic than diesel soot.

The first portion of the detailed description is most closely related to a sonic and dual stage gas inlet valve that could also be used for continuous water injection.

Figure 1:
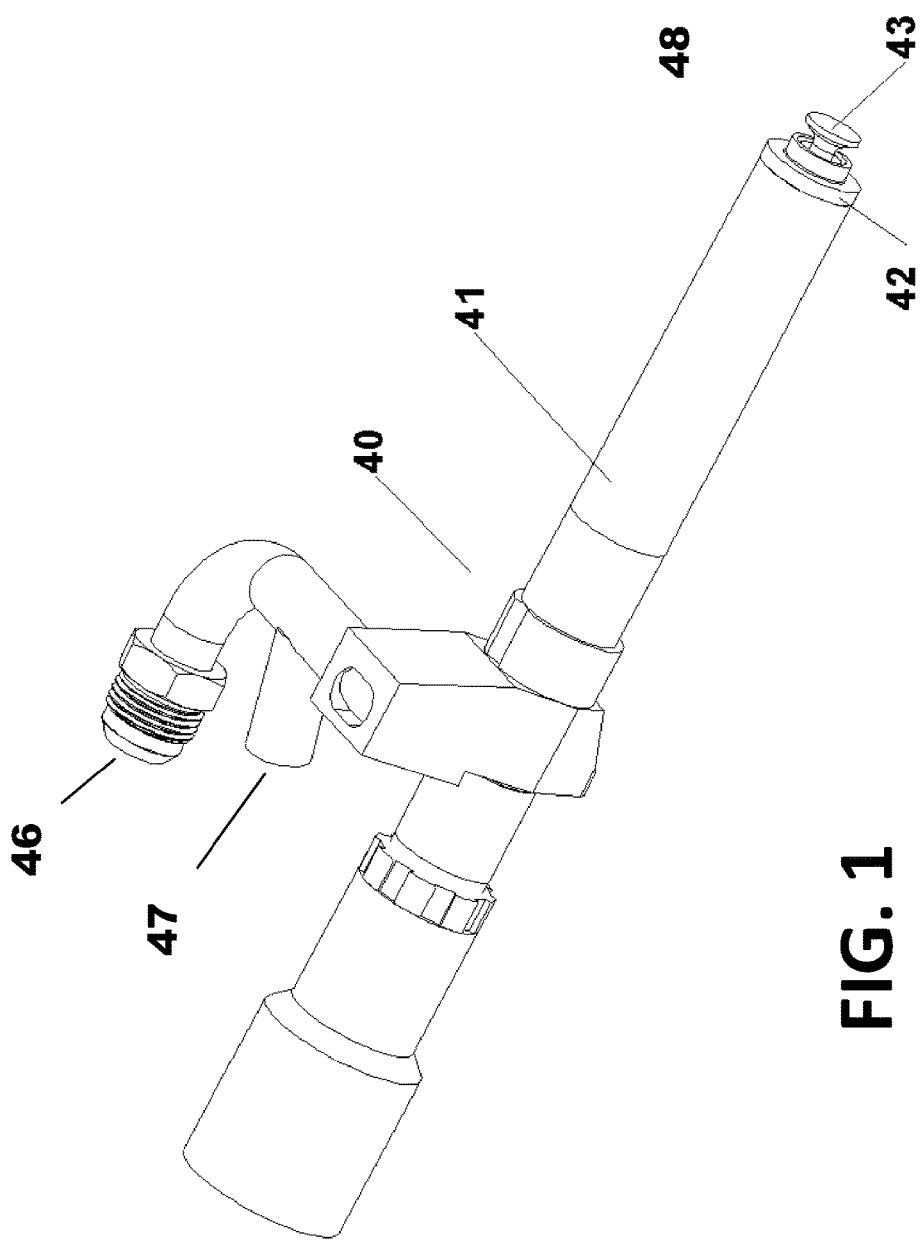
FIG. 1 is an isometric view of an ECI manufactured gas inlet valve (GIV).

FIG. 1 is an isometric view of a standard ECI GIV assembly 40. It illustrates the relationship between the GIV body 41 the valve seat insert 42 and the poppet valve 43. In this view the poppet valve is in the fully extended position. This particular valve assembly is designed to inject natural gas into and EMD 2 Stroke natural gas engine on the compression stroke. It is possible to use this direct injection valve design and any embodiment of the current invention in any reciprocating engine using any gaseous fuel. This GIV could also be used for direct and continuous water injection. Gaseous fuel is supplied to the GIV at natural gas inlet 46, secondary inlet 47 is where a supplemental water injector could be located. The mixed gaseous fuel and water mist could then exit the GIV into the combustion chamber at natural gas exit 48

Figure 2:
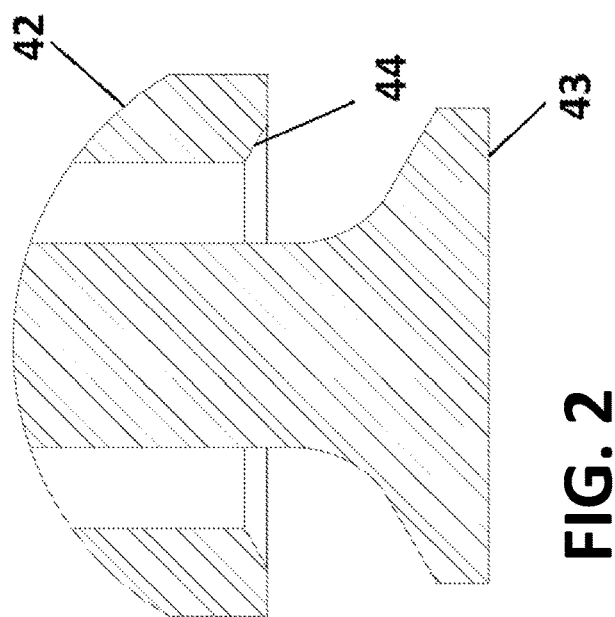
FIG. 2 is cross section view of a conventional poppet valve in the open position of a prior art GIV.

FIG. 2 is a cross section view of the prior art GIV assembly 40 from FIG. 1. FIG. 2 illustrates the poppet valve 43 and valve seat insert 42 when the poppet valve is fully extended. This valve is typical in construction to the exhaust and intake valves in most reciprocating piston engines. The valve seat area 44 is around 0.065" wide and the valve seat angle is 60 degrees from the valve axis. The intent of this valve system is specifically to allow the most airflow to pass through it with the minimal amount of pressure drop during the time is has available to be open. There is minimal consideration as to what the characteristics the exiting airflow has and the pressure drop across these valves is typically under 2:1 for conventional engine intake and exhaust valves and up to 4:1 for the GIV units used on turbocharged EMD engines with a natural gas feed pressure of 80 psi.

Figure 3:
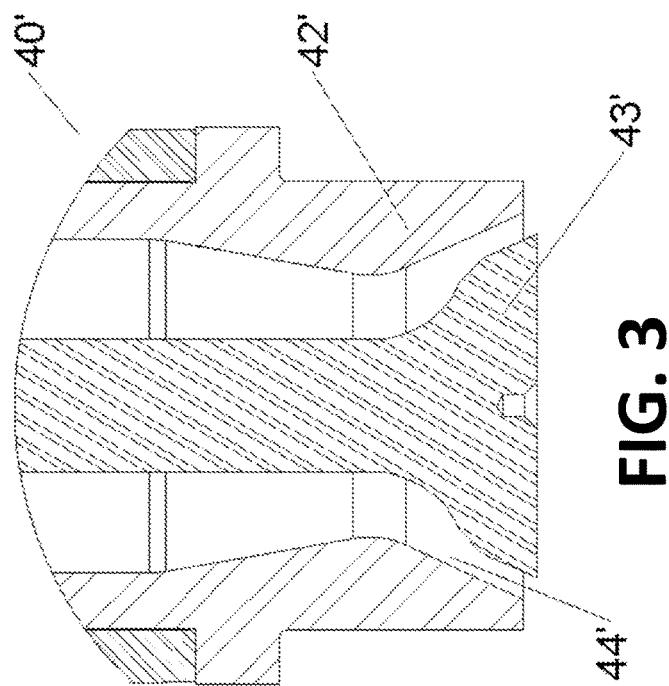
FIG. 3 is a cross section view of the revised poppet valve and valve seat insert to achieve sonic gas injection flow.

FIG. 3 is a cross section of the new poppet valve 43' and valve seat insert 42' design. Just the modification of these two parts converts ECI's standard GIV into a version that creates a sonic cone of injected gaseous fuel. The view on the left shows the valve in the closed position. Significantly different from FIG. 2 is that the flow cone angle is 50 degrees instead of 120. The valve seat angle is actually 25 degrees from the axis of poppet valve 43' instead of 60 degrees in the prior art design. The cone angle could be more or less than and 50 degrees. The narrower this angle is, the further into the cylinder bore that the gaseous fuel travels before it impinges on the cylinder wall for improved mixing.

Figure 4A:
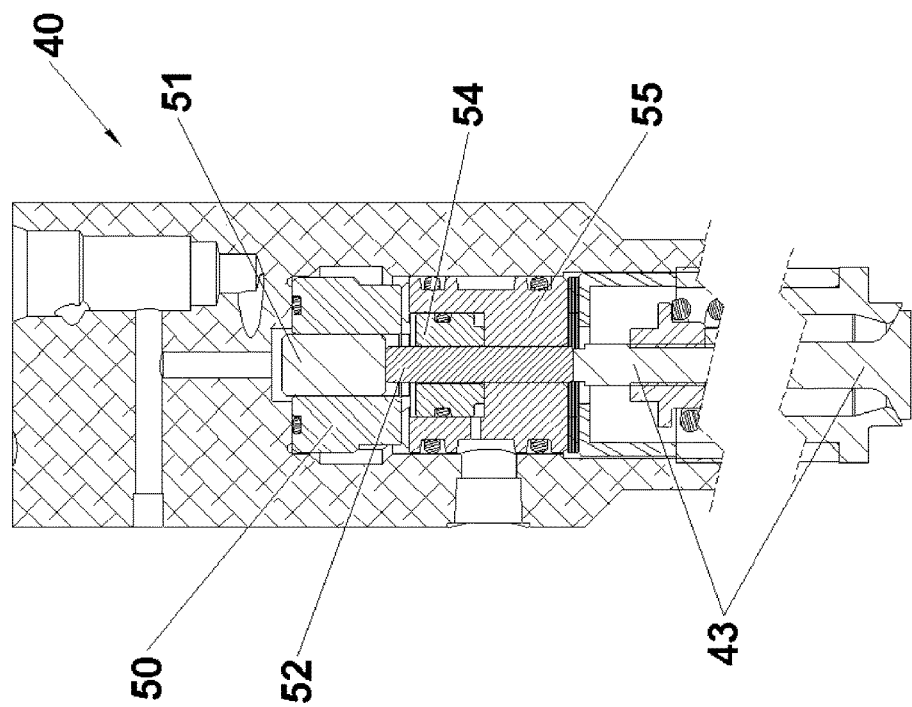
FIG. 4A is a cross section view illustrating a dual stage hydraulic valve assembly in the closed state.

FIG. 4A is a cross section view of a hydraulic actuator for the GIV assembly 40 with two discrete open positions. This view illustrates the GIV assembly 40 in the closed position. In this view the plunger 51 is inside of the plunger body 50, and it is the plunger 51 that the hydraulic fluid pushes down on to open up the poppet valve 43. These two parts are consistent with the standard prior art version of GIV assembly 40. What is added in this embodiment is the plunger follower 52, the plunger stop body 55 and the movable plunger stop 54.

Figure 4C:
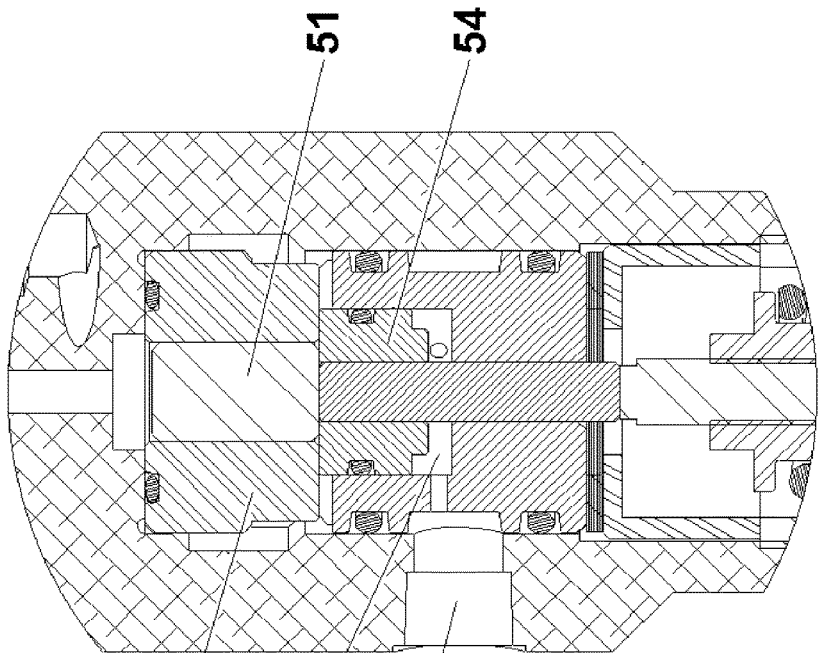
FIG. 4C is a cross section view illustrating a dual stage hydraulic valve assembly in the partially open state.
Figure 4B:
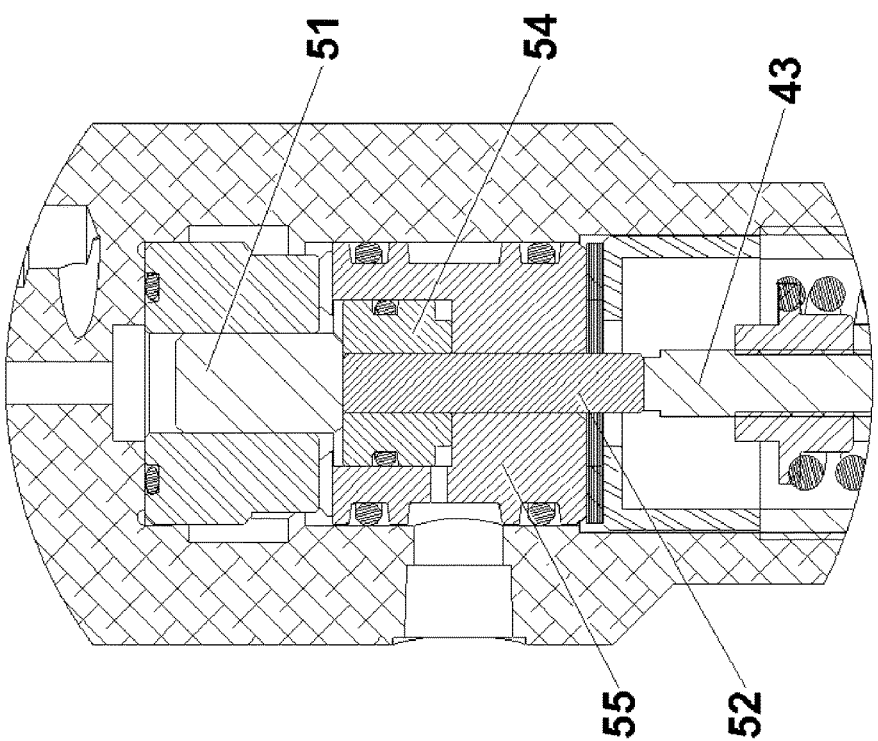
FIG. 4B is a cross section view illustrating a dual stage hydraulic valve assembly in the fully open state.

FIG. 4B the GIV assembly 40 is in the full open position. The plunger 51 was forced down by the hydraulic fluid until it contacted the movable plunger stop 54. The movable plunger stop 54 is resting on the top surface of the plunger stop body 55. When the plunger 51 started to move in the downward direction, it contacted, pushed down on and moved the plunger follower 52. The plunger follower 52 was in contact with the top of the poppet valve 43 and pushed it down also. All three parts continued to move downward until the plunger motion 51 was stopped as it contacted the movable plunger stop 54.

FIG. 4C illustrates the GIV assembly 40 in the partially open position. To stop the poppet valve 43 in this position, pressurized hydraulic fluid is fed into the plunger stop hydraulic port 53. This pressurizes the plunger stop hydraulic cavity 57 and this pressure forces the movable plunger stop 54 to move up until it contacts the bottom of the plunger body 50. With the movable plunger stop 54 in this position, the plunger 51 now travels a shorter distance before contacting the movable plunger stop 54 which will now limit the poppet valve 43 opening to a reduced stroke in the partially open position. The movable plunger stop 54 is able to keep the plunger 51 from moving it down because it has more surface area exposed to the hydraulic fluid pressure in the plunger stop hydraulic cavity 57.

This system could be designed to have more than one movable stop by multiplying certain features in this design.

The standard way to operate an ECI low pressure direct injection EMD conversion is to have the valves stay open for set amount of time for each piston stroke. This time period is set by the amount of time available at high RPM to inject gas after the intake ports are closed. After this time period is set, the engine load is controlled by adjusting the gas supply pressure to the injectors. As the load and RPM decreases and less fuel is required, the supply pressure is decreased. It would be possible to maintain a constant pressure and then reduce the injection time as fuel demand decreased, but that may decrease the amount of air and fuel mixing because the high velocity fuel gas was injected for a shorter period of time.

On a fuel system using standard poppet valves that achieve sonic flow at the valve periphery this would be a measurable effect.

This is the primary advantage of the GIV with multiple valve stroke settings. It reduces the total amount of injector feed pressure, instead of reducing the pressure for all 8 throttle notches in a locomotive. The pressure could be reduced incrementally for Notches 7 and 6, and then Notch 5 will have the GIV assembly 40 operate at reduced poppet valve 43 lift and a slightly longer valve open time because the RPM is now lower. From this point both the valve open time and gas supply pressure will be reduced incrementally down to the minimum flow needed at idle. The goal is to have the GIV fuel gas feed pressure remain high enough that good mixing is maintained, but balance that with manipulation of the valve open time to maximize the amount of time the high velocity injected gas is mixing with the air in the combustion chamber.

As an example, instead of having a constant 80 milliseconds of injection time starting at a pressure of 300 and dropping to 100 at notch 1, now the highest 3 throttle notches will have an 80 ms injection time and pressure will drop to 250 in notch 6. At throttle notch 5 the injection time is raised to 115 ms, the poppet valve 43 lift is 40% of full open and the injector feed pressure is raised back to 300. By notch 3 the injection time has be lowered back to 80 ms and pressure feed pressure has only been reduce down to 275. By throttle notch 1, the pressure has been further reduced to 220. By ending at a 220 psi supply pressure instead of 100 psi, the exit velocity of the gas leaving the GIV should still be sonic. If it had dropped down to 100 psi, it would likely have become subsonic in the GIV.

An interesting further use of this concept would be in large ship engines. Both 2 stroke and 4 stroke engines that are diesel pilot ignited would benefit from added swirl in the combustion chamber. Any number of these GIV's could be placed offset from the engine cylinder axis and tilted at an angle to induce a swirl to the air in the combustion chamber. If more than one supersonic GIV is used, they should have a similar angle in reference to the engine cylinder axis so that they induce swirl in the same direction. This swirl of air around the engine cylinder axis in the combustion chamber improves the combustion of the diesel pilot helping to lower PM or NOx emissions. This is because the swirl improves the air utilization during mixing controlled combustion as the surface of the diesel fuel jet is in contact with more air molecules than it would be if the air was stationary.

Another interesting possibility will be the incorporation of sonic flow GIV's with an opposed piston engine. If only one sonic GIV was used per cylinder there would be the risk of the gas flow impinging on the opposite cylinder wall. This may or may not have detrimental effects such as a colder spot at the cylinder wall with possible lubrication or thermal stress issues. If cylinder wall impingement is to be avoided or for improved mixing, two of these sonic GIV's could be placed directly opposite of each other across the combustion chamber, in this case the two cone shape flows would collide in the middle of the chamber causing a great amount of turbulence and entraining significantly more intake air in the cylinder before the cold gases reach the cylinder walls.

The second portion of this detailed description is most closely related to grouped cylinder deactivation on prechamber ignited EMD 2 stroke engines.

FIG. 5A illustrates the firing order of a 12 cylinder EMD 2-stroke engine. The top table is for firing all of the cylinders, the lower table illustrates just one bank firing. In the lower table the engine is broken down into two half engine banks with a top half and bottom half with either half being able to be deactivated leaving behind the rest of the engine to operate on cylinder to cylinder engine timing as even as the full engine was operating. If the top half of the engine operated by itself the firing order would be 1,7,3,9,2,8 with degrees between firings 45,75,45,75,45,75. Additionally, 9 of the cylinders could be deactivated leaving three cylinders still firing with 120 degree spacing if the three firing cylinders were all from the same quadrant of the engine, either 1,2,3 or 4,5,6 or 7,8,9, or 10,11,12.

FIG. 5B is a similar set of engine firing order tables, except for a 16 cylinder engine. In this case, when operating either the top half or bottom half of the engine, the cylinder firing spacing is an even 45 degrees. When only 4 cylinders in one quadrant are operated the cylinder spacing is still even at 90 degrees.

By being able to operate only 25% of the engine or 50% of the engine cylinders, the engine can be tuned to operate at more optimum air fuel ratios all the way down to idle and the prechambers can be turned off in banks with a simple isolation valve for each group of cylinders.

Programming the ECU to not fire the GIV's in the deactivated cylinders is only a matter of software changes. Turning off the prechamber fuel feed to the opposing banks requires some additional hardware, but that can be as simple as two or four electrically controlled valves, one for the fuel supply to each bank of prechambers.

As more advanced systems are proposed to get even lower emissions from these conversion systems, it will be likely that the prechamber supply pressure will not be constant. When the increased complexity of prechamber fuel pressure control is added, that would be a good time to institute this additional layer of control and hardware needed to turn on and off different prechamber feeds.

For simplicity of control or in early deactivation systems, all of the spark plugs can be fired, even those in deactivated cylinders. In more advanced systems it is likely that the spark plugs would not be fired when the cylinders are deactivated to extend the spark plug service lives. When turning on and off the prechamber fuel supply, it may be beneficial to turn the spark plugs on a few cycles early, and when turning off the prechamber fuel supply it would be beneficial to fire the spark plugs a few cycles later.

The third portion of this detailed description is most closely related to a variable compression ratio mechanism for an OPOC engine. This variable compression ratio system would operate on the outer pistons in the OPOC design.

Figure 6:
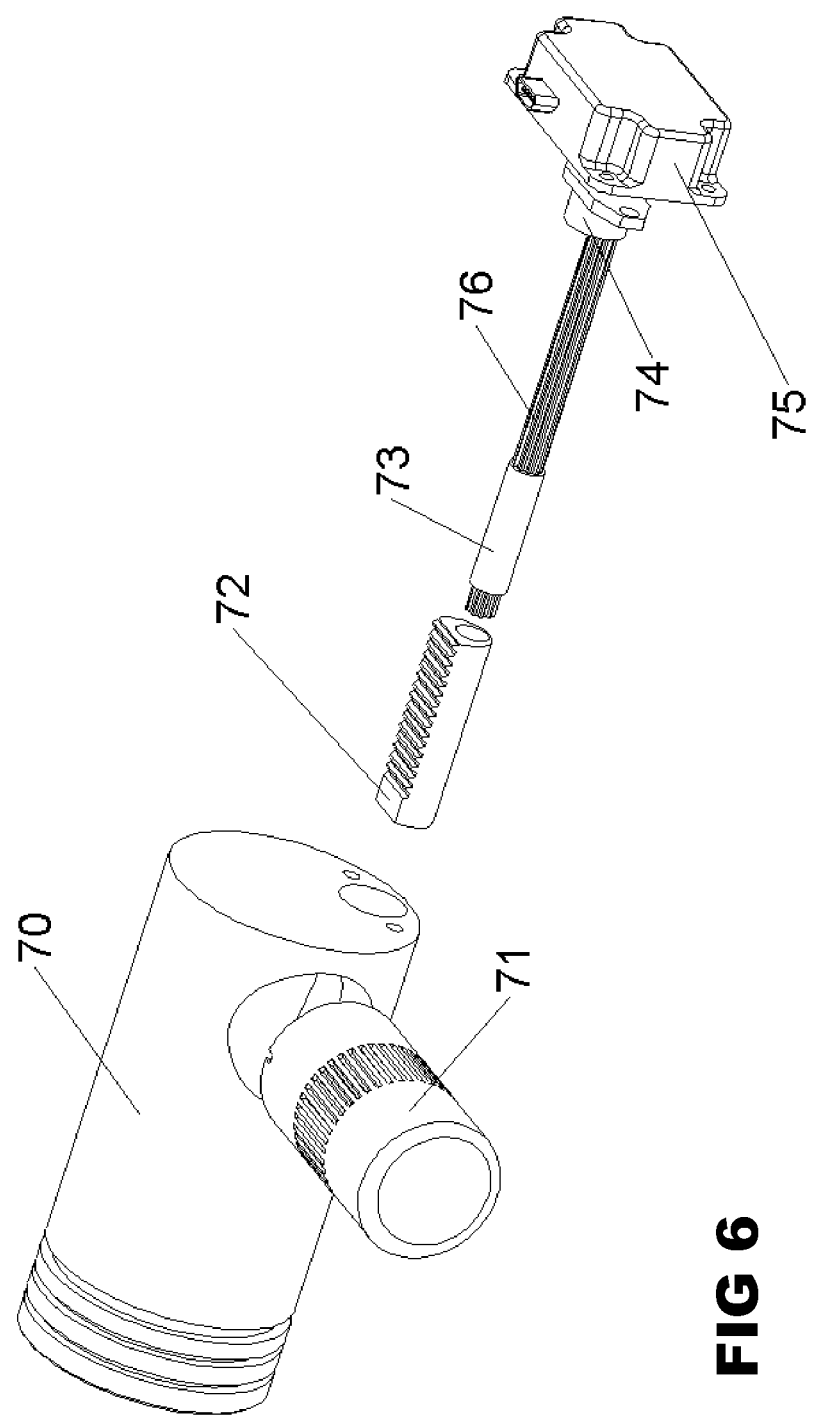
FIG. 6 is an exploded view of an OPOC engine Variable Compression Ratio system.

FIG. 6 is an exploded view of the VCR system. The outer wrist pin 71 slides into the piston 70. There is an offset hole in the outer wrist pin 71 that the inner wrist pin (not shown) would be captured by. It is by rotating this outer wrist pin 71 around the inner wrist pin that the compression ratio is varied. The outer wrist pin 71 has a set of teeth machined into it and these teeth match the teeth cut into the rack gear 72. The rack gear is free to slide axially along a bored hole in the piston 70, as the rack gear 72 moves relative to the piston 70 it rotates the outer wrist pin 71 adjusting the compression ratio. The rack gear 72 has a female threads cut into it and the rack gear threaded insert 73 has a matching male thread on its OD that interfaces with the rack gear 72 internal thread. The rack gear threaded insert 73 is axially restrained in the piston 70 between a boss inside and the threaded insert retainer 74 that bolts to the back of the piston. It is the rack gear threaded insert 73 that positions the rack gear 72 axially in the piston 70 to set the compression ratio. The VCR actuator 75 is attached to the engine end cover and is fixed in place relative to the reciprocating motion of piston 70. It has a male splined shaft 76 that interfaces with the female internal splines inside the rack gear threaded insert 73. As the piston reciprocates inside its cylinder, the rack gear threaded insert 73 slides back and forth over the VCR actuator male splined shaft 76. It is the VRC actuator that sets the compression ratio in each cylinder. In this embodiment there is an actuator for each cylinder in the engine. It would be possible to belt drive multiple spline rod assemblies with one actuator.

In this design both the VCR actuator 75 male splined shaft 76 and the rack gear threaded insert 73 can be replaced as service items without disassembling the engine.

It should be noted that various changes and modifications to the presently preferred embodiments described herein will be apparent to those skilled in the art. Such changes and modifications may be made without departing from the spirit and scope of the present invention and without diminishing its attendant advantages.

The fourth portion of this detailed description is most closely related to a prechamber assembly with a tilted throat used to improve the internal mixing of the supplemental fuel with the incoming very lean main charge.

Figure 7:
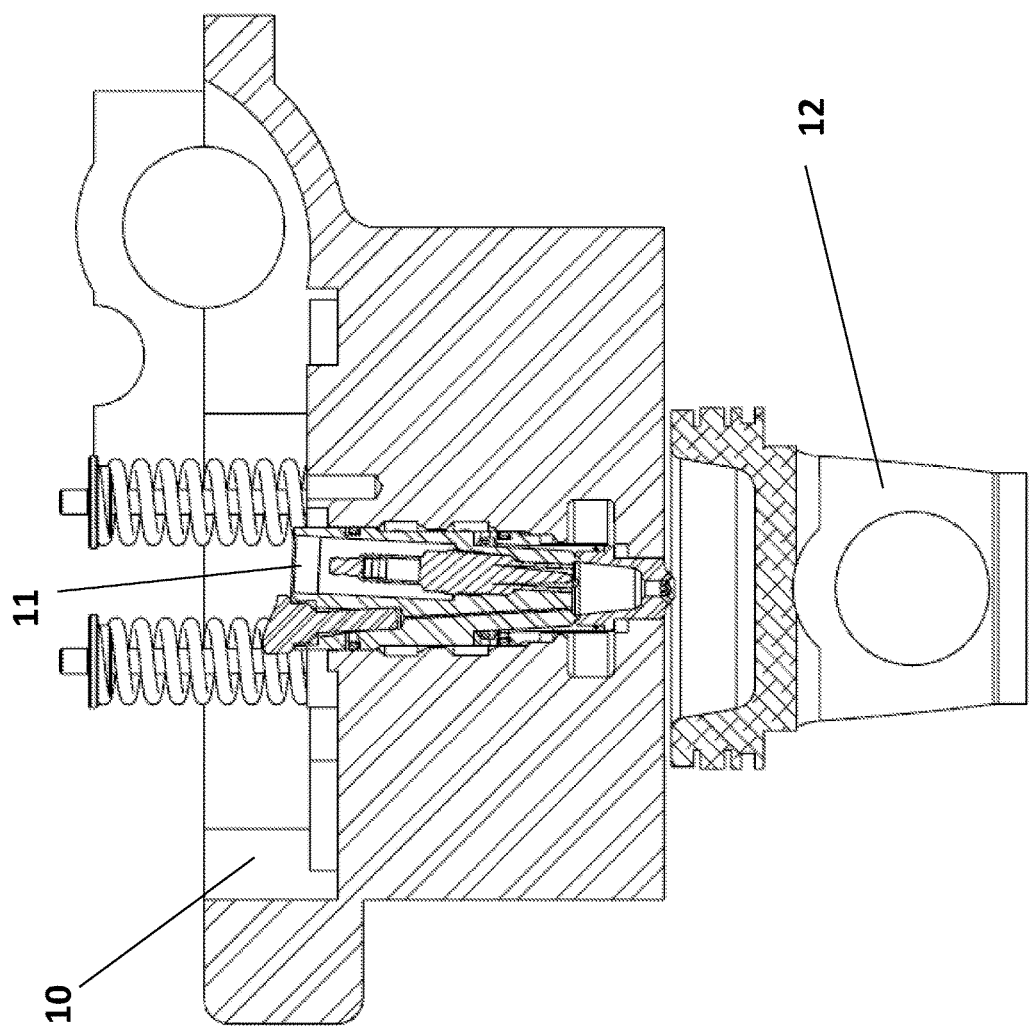
FIG. 7 is a section view of a truck engine cylinder head, prechamber assembly, and piston.

FIG. 7 is a section view of a typical of a class 8 truck cylinder head 10 with a piston 12 and prechamber assy 11. In this case piston 12 is a low compression piston with a compression ratio of 10.5 to 1.

Figure 8:
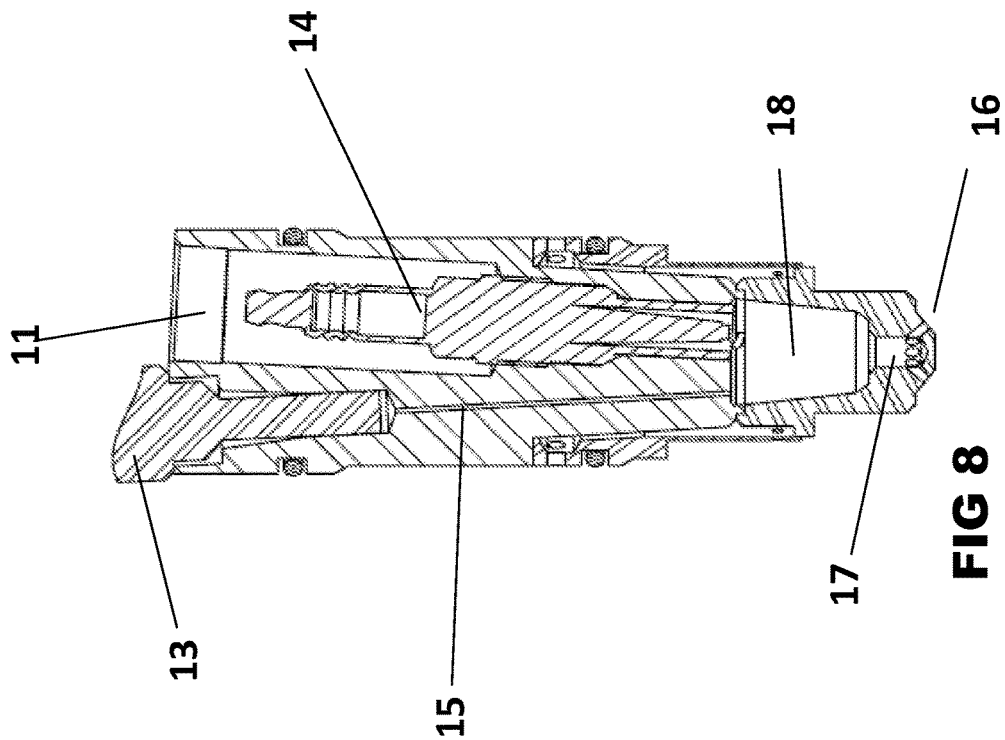
FIG. 8 is a section view of a prior art prechamber with a conventional straight throat.

FIG. 8 is a section view of a prior art prechamber assy 11. Injector 13 is used to control the flow of supplemental fuel through fuel passage 15 into the prechamber combustion volume 18. Spark Plug 14 is used to ignite the air and fuel mixture within the prechamber combustion volume 18. The rapidly burning air and fuel mixture generates high temperature and pressure within the prechamber combustion volume 18 forcing hot burning combustion by-products to pass through the throat 17 and then through one of the multiple jets 16. It is the high velocity burning jets of combusting air and fuel exiting the multiple jets 16 that create multiple ignition sites in the engine cylinder main chamber between cylinder head 10 and piston 12. FIG. 7 makes it apparent that the fuel passage 15 and spark plug 14 are on opposite sides of the prechamber axis. During the compression stroke of the engine cylinder while piston 12 is moving vertically along the cylinder towards head 10, increased pressure will cause main charge to flow through jets 16 combining in throat 17 and flowing through throat 17 into the prechamber combustion volume 18. In the prior art prechamber assembly 11 throat 17 is aimed along the axis of the prechamber which will cause the incoming main charge to flow along the axis into the prechamber aimed at a point inbetween spark plug 14 and fuel passage 15. Because of this the incoming supplemental fuel that is injected through supplemental fuel passage 15 is likely to be mixed with a portion of the incoming main charge that swirls on the left side of the prechamber combustion volume 18. Another portion of incoming main charge will swirl on the opposite side where spark plug 14 is. This axial flow of the incoming main charge prevents most of the supplemental fuel from enriching the air fuel ratio near the spark plug making it a challenge for spark plug 14 to ignite the air fuel mixture at its electrode where the spark will occur because it is closer to the air fuel ratio of the main charge.

Figure 9:
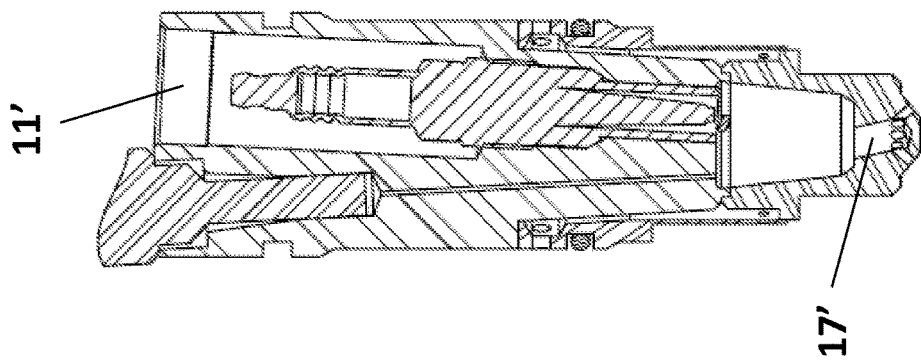
FIG. 9 is a section view of a prechamber assembly with an angled throat to improve prechamber mixing of supplemental fuel with incoming main chamber lean mixture of air and fuel.

FIG. 9 is a section view of prechamber assembly 11' which is manufactured with a throat 17' which is not in line with the axis of the prechamber assembly 11'. In this case the axis of the throat is angled towards the prechamber combustion volume 18 wall to the left of where fuel passage 15 enters. In this case the incoming main charge will now have to swirl from left to right bringing the supplemental fuel with the main charge across the area where spark plug 14 will ignite the mixture. Now that the main charge is mixed with the supplemental fuel it should be closer to a stoichiometric mixture which would make ignition of the mixture more likely by spark plug 14. The more thorough mixture of supplemental fuel and main charge throughout the prechamber combustion volume 18 will create a faster burn rate and higher pressure within the prechamber combustion volume 18 creating faster and more thorough combustion in the main chamber between head 10 and piston 12.

The fifth portion of this detailed description is most closely related to injecting a mixture of fuel and air into a prechamber to improve mixing and scavenging.

In an alternate embodiment Injector 11 in FIG. 8, injector 13 may be used to inject a mixture of air and fuel instead of fuel only as in prior art prechamber systems. When an engine is operating at low loads, only a small amount of supplemental fuel is required to be injected into the prechamber combustion volume 18. As this volume gets smaller, the either the injection duration or injection pressure must drop to reduce the flow. Losing either injection duration or injection pressure will reduce the amount of mixing that the injected supplemental fuel does with the incoming main charge. One way to increase the duration or pressure of injection is to also inject air with the fuel to increase the total volume injected. This not only increases internal mixing, but the increased volume of injected air and fuel will also help push out any remaining combustion byproducts still in the prechamber combustion volume 18 from the previous cycle.

In another embodiment injector 13 is replaced with a simple check valve, this is common for prechamber systems on large 2-stroke engines. With the use of check valve in place of injector 13 there is no control over injection duration so at low supplemental fuel flows the injection pressure will drop significantly. This mixing of air and supplemental fuel in the check valve case is even more beneficial as injection pressure drops so low that the supplemental fuel may pool at the top of the prechamber combustion volume making internal mixing even more of a challenge.

I claim:

1. A gas injection valve comprising:
   a poppet valve extending from a valve body having a valve seat;
   a plunger moveable within a plunger body, wherein the plunger body is secured within the valve body;
   a plunger stop axially moveable within a plunger stop enclosure formed within a plunger stop body secured within the valve body adjacent to the plunger body, wherein the plunger stop is moveable between a first position and a second position, and wherein a hydraulic cavity is formed within the enclosure between a lower surface of the plunger stop and the plunger stop body;
   a plunger follower secured to and extending through the plunger stop and in contact with the poppet valve; and
   a port for receiving hydraulic fluid extending through the valve body into the hydraulic cavity of the plunger stop body enclosure;
   wherein the gas injection valve has a first stroke length and a second stroke length when the plunger stop is in the first position and the second position, respectively.

2. The gas injection valve of claim 1, wherein the plunger stop is positioned closest to the plunger when the plunger stop is in the first position.

3. The gas injection valve of claim 2, wherein the plunger stop is positioned farthest from the plunger when the plunger stop is in the second position.

4. The gas injection valve of claim 3, wherein the first stroke length is less than the second stroke length.

5. The gas injection valve of claim 1, further comprising compressed air within the hydraulic cavity of the plunger stop enclosure when the plunger stop is in the second position.

6. The gas injection valve of claim 1, wherein the lower surface of the plunger stop has a greater surface area than a lower surface of the plunger.

7. A method of improving air and fuel mixing in an engine comprising the steps of:
   providing a gas injection valve comprising:
      a poppet valve extending from a valve body having a valve seat;
      a plunger moveable within a plunger body, wherein the plunger body is secured within the valve body;
      a plunger stop axially moveable within a plunger stop enclosure formed within a plunger stop body secured within the valve body adjacent to the plunger body, wherein the plunger stop is moveable between a first position and a second position, and wherein a hydraulic cavity is formed within the enclosure between a lower surface of the plunger stop and the plunger stop body;
      a plunger follower secured to and extending through the plunger stop and in contact with the poppet valve; and
      a port for receiving hydraulic fluid extending through the valve body into the plunger stop body enclosure;
   wherein the gas injection valve has a first stroke length when the plunger stop is in the first position; and
   wherein the gas injection valve has a second stroke length when the plunger stop is in the second position; and
   injecting hydraulic fluid into the port to move the plunger stop from the second position to the first position.

8. The method of claim 7, wherein the poppet valve has a first valve lift and a second valve lift associated with the first position and the second position, respectively, and wherein the first valve lift is greater than the second valve lift.

9. The method of claim 8, further comprising the steps of injecting gas for a first duration when the poppet valve is in the first position and injecting gas for a second duration when the poppet valve is in the second position, wherein the second duration is longer than the first duration.

10. A method for increasing the air and fuel mixing in an engine comprising the steps of:
    providing a gas injection valve comprising:
       a poppet valve extending from a valve body having a valve seat;
       a plunger moveable within a plunger body, wherein the plunger body is secured within the valve body;
       a plunger stop axially moveable within a plunger stop enclosure formed within a plunger stop body secured within the valve body adjacent to the plunger body, wherein the plunger stop is moveable between a first position and a second position through hydraulic means;
       a plunger follower secured to and extending through the plunger stop and in contact with the poppet valve; and
       a port for receiving hydraulic fluid extending through the valve body into the plunger stop body enclosure;
       wherein the gas injection valve has a first lift when the plunger stop is in the first position; and
       wherein the gas injection valve has a second lift when the plunger stop is in the second position, and wherein the second lift is less than the first lift; and
    injecting gas for a first duration when the poppet valve is in the first position; and
    injecting gas for a second duration when the poppet valve is in the second position, wherein the second duration is longer than the first duration.

11. The method of claim 10, further comprising the step of injecting hydraulic fluid into the port to move the plunger stop from the second position to the first position.

12. The method of claim 10, wherein the second duration is about 115 ms and the first duration is about 80 ms.

* * * * *